US007276224B2

(12) United States Patent
Zachariah et al.

(10) Patent No.: US 7,276,224 B2
(45) Date of Patent: Oct. 2, 2007

(54) SYNTHESIS OF NANOPOROUS PARTICLES

(75) Inventors: Michael R. Zachariah, Eden Prairie, MN (US); Benjamin Y. H. Liu, North Oaks, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 843 days.

(21) Appl. No.: 10/167,346

(22) Filed: Jun. 11, 2002

(65) Prior Publication Data

US 2007/0207084 A1    Sep. 6, 2007

(51) Int. Cl.
*C01F 7/00* (2006.01)
*C01B 13/00* (2006.01)

(52) U.S. Cl. .............. 423/592.1; 423/625; 423/593.1; 423/624; 423/618; 423/617; 423/508; 423/604; 423/605; 423/608; 423/606; 423/632; 423/594.17; 423/594.19

(58) Field of Classification Search ............ 423/22, 423/111, 625, 21.1, 263, 592.1, 593.1, 624, 423/618, 617, 508, 604–608, 632, 594.17, 423/594.19

See application file for complete search history.

(56) References Cited

U.S. PATENT DOCUMENTS

| | | | |
|---|---|---|---|
| 4,138,336 A | 2/1979 | Mendel et al. | |
| 5,015,373 A | 5/1991 | Carr et al. | |
| 5,108,597 A | 4/1992 | Funkenbusch et al. | |
| 5,141,634 A | 8/1992 | Carr et al. | |
| 5,182,016 A | 1/1993 | Funkenbusch et al. | |
| 5,205,929 A | 4/1993 | Carr et al. | |
| 5,254,262 A | 10/1993 | Funkenbusch et al. | |
| 5,271,833 A | 12/1993 | Funkenbusch et al. | |
| 5,346,619 A | 9/1994 | Funkenbusch et al. | |
| RE34,910 E | 4/1995 | Funkenbusch et al. | |
| 5,540,834 A | 7/1996 | Carr et al. | |
| 5,599,511 A * | 2/1997 | Helble et al. ............... | 422/232 |
| 5,614,472 A * | 3/1997 | Riddle et al. ............... | 505/425 |
| 5,837,826 A | 11/1998 | Flickinger et al. | |
| 5,958,361 A * | 9/1999 | Laine et al. ................ | 423/610 |
| 6,036,861 A | 3/2000 | Flickinger et al. | |

FOREIGN PATENT DOCUMENTS

| | | | |
|---|---|---|---|
| EP | 0 331 283 A1 | | 9/1989 |
| JP | 63-260822 | * | 10/1988 |
| JP | S63-260822 | | 10/1988 |
| KR | 10-2001-0038293 | * | 5/2001 |

OTHER PUBLICATIONS

Translation of Korea 10-2001-0038293, May 15, 2001.*
Dubois., "Preparation of Fine, Spherical Yttria-Stabilized Zirconia by the Spray-Pyrolysis Method," *J. Am. Ceram. Soc.,* 1989; 72(4):713-15.

Efendiev et al.,"A model for two-component aerosol coagulation and phase separation: a method for changing the growth rate of nanoparticles." *Chemical Engineering Science,* 2001: 56:5763-5769.

Ehrman et al., "Effect of temperature and vapor-phase encapsulation on particle growth and morphology," *J. Mater, Res.,* Apr. 1999; 14(4):1664-1671.

Fan et al., "Multiphased assembly of nanoporous silica particles," *J. Non-Crystalline Solids,* 2001; 285:71-8.

Fissan et al., "Determination of Particle Size Distributions By Means of an Electrostatic Classifier," *J. Aerosol Sci.,* 1983; 14:354-357.

Gadalla et al., "Preparation of fine, hollow, spherical $NiFe_2O_4$ powders," *J. Mater. Res.,* Dec. 1990; 5(12):2923-7.

Göltner et al., "Mesoporous Materials by Templating of Liquid Crystalline Phases," *Adv. Mater.,* 1997; 9(5):431-436.

Guinier, *X-Ray Diffraction in Crystals, Imperfect Crystals, and Amorphous Bodies,* Freeman, San Francisco, 1963, title page, publication page, and p. 124.

Holland et al., "Synthesis of Macroporous Minerals with Highly Ordered Three-Dimensional Arrays of Spheroidal Voids," *Science,* Jul. 24, 1998; 281 :538-540.

Iskandar et al., "In Situ Production of Spherical Silica Particles Containing Self-Organized Mesopores," *Nano Letters,* 2001; 1 (5):231-234.

Kim et al., "Synthesis of Nanoporous Metal Oxide Particles by a New Inorganic Matrix Spray Pyrolysis Method," *Chem. Mater.,* Jun. 17, 2002; 14(7):2889-99: published on Web Jun. 17, 2002.

Knutson et al., "Accurate measurement of aerosol electric mobility moments," *J. Aerosol Sci.,* 1975; 6:453-460.

Kodas et al., *Aerosol Processing of Materials,* Wiley-VCH, 1999, title page, publication page and table of contents only, 14 pages.

Kodas et al., "Alumina Powder Production by Aerosol Processes," *Alumina Chemicals: Science and Technology Handbook,* The American Ceramic Society, Inc., 1990, title page, publication page and pp. 375-383.

May, "The Collision Nebulizer. Description, Performance and Application." *J. Aerosol Sci.,* 1973; 4(3):235-243.

Seinfeld et al., *Atmospheric Chemistry and Physics from Air Pollution to Climate Change,* John Wiley & Sons, Inc., 1998, title page, publication page and table of contents only, 19 pages.

Senzaki et al., "Preparation of Strontium Ferrite Particles by Spray Pyrolysis," *J. Am. Ceram. Soc.,* 1995; 78(11):2973-6.

Struchtrup et al., "A model for kinetically controlled internal phase segregation during aerosol coagulation," *J. Aerosol Sci.,* 2001; 32:1479-1504.

(Continued)

*Primary Examiner*—Steven Bos
(74) *Attorney, Agent, or Firm*—Mueting Raasch & Gebhardt, P.A.

(57) ABSTRACT

Methods of producing nanoporous particles by spray pyrolysis of a precursor composition including a reactive precursor salt and a nonreactive matrix salt are provided, wherein the matrix salt is used as a templating medium. Nanoporous aluminum oxide particles produced by the methods are also provided.

25 Claims, 12 Drawing Sheets

OTHER PUBLICATIONS

Velev et al., "Microstructured porous silica obtained via colloidal crystal templates," *Chem. Mater.*, 1998: 10:3597-3602.

Xia et al., "Synthesis of $CeO_2$ nanoparticles by salt-assisted ultrasonic aerosol decomposition," *J. Mater. Chem.*, 2001: 11:2925-2927.

Xia et al., "Novel Route to Nanoparticle Synthesis by Salt-Assisted Aerosol Decomposition," *Adv. Mater.*, 2001; 13(20):1579-1582.

Zachariah et al., "Aerosol processing of YBaCuO superconductors in a flame reactor," *J. Mater. Res.*, Feb. 1991; 6:264-9.

Ciminelli, "Synthesis of Alumina From $Al(NO_3)_3$-$9H_2O$ by the Evaporative Decomposition of Solution Process," Master of Science Thesis, 1983, Pennsylvania State University.

Weast, Ed., *Handbook of Chemistry and Physics*, $55^{th}$ *Ed.*, Cleveland, OH, 1974, cover page, title page, pp. B-122 & B-137.

Windholz et al, Eds., *The Merck Index*, Rahway, NJ, 1983, cover page, title page, p. 140.

* cited by examiner

SYNTHESIS OF NANOPOROUS PARTICLES

BACKGROUND

Microporous inorganic solids, such as synthetic and naturally-occurring zeolites, have found wide use in such applications as molecular sieves, filtration, and purification materials, due to their large internal surface area. However, because of the limitation of pore size of these materials to typically no smaller than about 1.5 nanometers (nm), new synthetic methods have been investigated to extend the range of available pore sizes of porous inorganic materials, such as metal oxides. Such methods include using templates of surfactant liquid (Göltner et al., *Adv. Mater.*, 9(5):431 (1997)) and colloidal (Velev et al., *Chem. Mater.*, 10:3597 (1998)) crystals to produce mesoporous materials with pore diameters of about 2 nm to about 10 nm. These new methods successfully expand the porosity of zeolite-type materials. However, although these methods provide useful materials for expanded opportunities in the fields of molecular sieving and chemical adsorption, these methods have the disadvantage of requiring a secondary hydrothermal process to remove the surfactant. Such thermal processes may result in collapse of the porous structure. Furthermore, most templating procedures in batch reactor operations require time-consuming methods, one-time-only use of the templating material, and auxiliary solvent extraction. Such considerations may make otherwise promising applications using the porous materials commercially uneconomical.

Nanoporous alumina is a preferred product because it is increasingly being used in adsorption and catalysis, wherein their large surface area, pore structure, and unique surface chemistry play essential roles (Kodas et al., "Alumina Powder Production by Aerosol Processes," *Alumina Chemicals: Science and Technology Handbook*, The American Ceramic Society, Inc. (1990)).

Metal and metal oxides may be useful as a porous inorganic material in such applications as previously described, provided an adequate porosity is achieved. Metal and metal oxide particles may be easily produced by the spray pyrolysis process, which is one of the simplest and most industrially viable production methods in use. Spray pyrolysis involves the use of one or more precursors dissolved in a solvent and aerosolized into a droplet stream, which is then typically processed in a tubular reactor or flame (Zachariah et al., *J. Mat. Res.*, 6:264(1991)). Typically, solvent evaporation is accompanied by precursor precipitation, and a thermally driven reaction to produce the final product. A wide variety of materials have been produced by this method using single and multi-component metals and metal-oxides (Kodas et al., *Aerosol Processing of Materials*, Wiley-VCH (1999)). A well known approach using spray pyrolysis to produce metal oxides involves using metal nitrate salts, which are readily available, have reasonable solubility in water, and decompose at moderate temperatures (less than about 500° C.). Conventional spray pyrolysis processes may, however, provide hollow particles of metal oxides (Dubois et al., *J. Am. Ceram. Soc.*, 72(4):713 (1989); Gadalla et al., *J. Mater. Res.*, 5(12):2923 (1990); Senzaki et al., *J. Am. Ceram. Soc.*, 78(11):2973 (1995)) which may not provide sufficient particle surface area for an intended application. There is a need, therefore, for a spray pyrolysis process that provides a nanoporous metal oxide material that is able to provide adequate particle surface area for an intended application.

Recently, mesoporous silica particles have been produced by a spray pyrolysis method, in which polystyrene spheres and surfactants are employed to produce multiphased self-assembly nanostructures in an evaporating droplet mixed with tetraethylorthosilicate (TEOS, $Si(OCH_2CH_3)_4$), ethanol, and water (Fan et al., *J. Non-Crystalline Solids,* 285:71 (2001)). However, this process has the disadvantage of requiring a secondary thermal calcination process to remove the nanophased additives from the matrix of the silica/surfactant/polystyrene spheres that, as indicated above, may cause a collapse of the particle's porous structure. Furthermore, this method requires the use of polystyrene spheres, which are an expensive precursor.

In a related work, nanoparticles have been produced using a salt-assisted spray pyrolysis method. In this approach, molten salt was used to slow down the growth rate of the particles (Xia et al., *Adv. Mater.*, 13(20):1579(2001)). Similar experiments have been conducted in which the salt matrix is generated in-situ by the reaction of sodium with metal halides (Ehrman et al., *J. Mater. Res.*, 14(4):1664 (1999)). Models have also been developed for coagulating nanoparticles, in which the nanoparticles are treated as immiscible liquid entities (nanodroplets) within much larger liquid aerosol drops composed of salt or droplets of another liquid medium (Struchtrup et al., *J. Aerosol. Sci.*, 32:1479 (2001); Efendiev et al., *Chem. Eng. Sci.*, 56:5763 (2001)). The growth rate and number concentration of nanoparticles in the liquid droplets are strongly dependent on the viscosity of the major phase. Since viscosity is highly temperature sensitive, temperature could be employed to change the growth rate of nanoparticles within the liquid droplets (Struchtrup et al., *J. Aerosol. Sci.*, 32:1479 (2001); Efendiev et al., *Chem. Eng. Sci.*, 56:5763 (2601)). The above-described salt-assisted spray pyrolysis methods, however, do not necessarily provide nanoporous materials. Thus a spray pyrolysis method that is able to provide the desired nanoporous materials is needed.

SUMMARY OF THE INVENTION

The present invention provides a method of forming nanoporous particles, the method including: providing a precursor composition including at least one reactive precursor salt and at least one matrix salt, wherein the decomposition temperature of the reactive precursor salt is lower than the melting point of the matrix salt; spray pyrolyzing the precursor composition, thereby forming precursor droplets, at a temperature below the melting point of the matrix salt and above the decomposition temperature of the precursor salt to form particles including matrix salt and decomposed precursor salt; and rinsing the matrix salt from the particles to form nanoporous particles. The precursor salt is chosen such that, when spray pyrolyzed, it forms particles of the desired material. The matrix salt forms the template structure of the particles' pores, providing a nanoporous particle upon being removed from the spray pyrolyzed particles. The invention further provides particles preparable by this method.

The invention further provides a method of forming nanoporous particles of aluminum oxide including: providing an aqueous precursor composition including at least one aluminum salt and at least one alkali metal salt, wherein the mole ratio of aluminum salt to alkali metal salt is about 1:1, and the concentration of aluminum salt and alkali metal salt present in the composition is about 1 weight percent, based on total weight of the composition; spray pyrolyzing the precursor composition, thereby forming precursor droplets, at a temperature below the melting point of the alkali metal salt and above the decomposition temperature of the aluminum salt to form particles including alkali metal salt and decomposed aluminum salt, wherein the precursor composition is spray pyrolyzed under conditions to form aluminum oxide; and rinsing the alkali metal salt from the particles of alkali metal salt and decomposed aluminum salt in an aqueous rinse to form nanoporous particles of aluminum oxide.

In addition, the present invention provides nanoporous aluminum oxide particles preparable by a method including: providing an aqueous precursor composition including an aluminum salt and an alkali metal salt, wherein the mole ratio of the aluminum salt to the alkali metal salt is about 1:1, and the concentration of the aluminum salt and the alkali metal salt present in the composition is about 1 weight percent, based on the total weight of the composition; spray pyrolyzing the precursor composition, thereby forming precursor droplets, at a temperature below the melting point of the alkali metal salt and above the decomposition temperature of the aluminum salt to form particles including alkali metal salt and decomposed aluminum salt, wherein the precursor composition is spray pyrolyzed under conditions to form aluminum oxide; and rinsing the alkali metal salt from the particles of alkali metal salt and decomposed aluminum salt in an aqueous rinse to form nanoporous aluminum oxide particles.

DETAILED DESCRIPTION OF PREFERRED EMBODIMENTS

Figure 1:
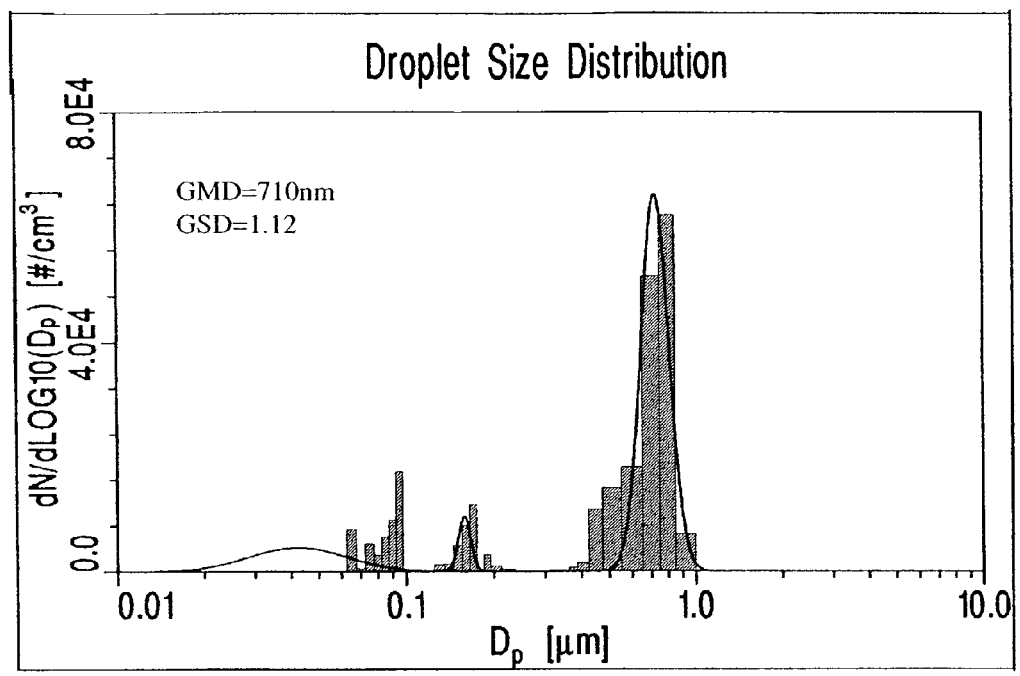
FIG. 1—Droplet size distribution from atomizer (prior to diffusion dryer) measured with laser aerosol spectrometer (GMD:Geometric Mean Diameter, GSD:Geometric Standard Deviation).

The present invention includes methods for producing a nanoporous particle. The particles of the invention preferably have a pore size that is at least about 2 nm in diameter. The pores are preferably no larger than about 20 nm in diameter. Additionally, the nanoporous particles may be of any size useful in the invention. Generally, however, the particles are at least about 90 nm in diameter. Smaller particles may be produced; however, smaller particles may have lesser utility since as the size of the particle approaches the size of the nanopores, particles that are generally hollow rather than porous may be produced. Generally, the particles are formed by spray pyrolyzing a precursor composition including a reactive salt (the precursor salt) and a nonreactive salt (the matrix salt).

In the present preferred methods, generally, at least one nonreactive salt (the matrix salt) is employed as an inexpensive and recyclable templating medium in the formation of nanoporous particles. The matrix salt is provided, along with at least one reactive precursor salt to form a precursor composition. The precursor composition is then spray pyrolyzed, by methods known in the art (Xia et al., *Adv. Mater.*, 13(20):1579 (2001)) to form solid, preferably nanoporous porous particles of the precursor composition. The precursor salt and matrix salt are selected such that they can be spray pyrolyzed, they provide the desired nanoporous template structure, and they provide the desired material of the final particle.

The matrix salt is generally nonreactive with the precursor salt, enabling it to form a nanoporous network that supports the structure of the particle formed by spray pyrolysis. The matrix salt may then be separated from the spray pyrolyzed particle by rinsing, preferably in an aqueous rinse, to produce, preferably, a nanoporous particle. Any liquid may be used as a rinse, provided the matrix salt is soluble in the rinse. Preferable matrix salts are those that are soluble in an aqueous rinse at room temperature, providing an inexpensive, recyclable templating medium that is easily spray pyrolyzed, stable at relatively high temperatures, such as about 700° C., and are easily separated from the spray pyrolyzed precursor composition to produce a nanoporous particle.

Matrix salts suitable for use may have various melting points and viscosities. Such variations may affect the pore size and structure of the resultant nanoporous particle, and such considerations may be used in the selection of an appropriate salt or combination of salts. In addition to having melting point temperatures higher than the selected precursor salt, preferred matrix salts typically have lower solubilities, at room temperature, in the vehicle of the precursor composition than the selected precursor salts. Preferred matrix salts are chosen from the group of Group IA and Group IIA metal salts, and combinations thereof.

More preferred matrix salts are salts selected from the fluorides, chlorides, bromides, and iodides of Group IA and Group IIA metal salts, and combinations thereof. Even more preferred matrix salts are salts selected from the group of sodium fluoride, sodium chloride, sodium bromide, sodium iodide, potassium fluoride, potassium chloride, potassium bromide, potassium iodide, lithium fluoride, lithium chloride, lithium bromide, lithium iodide, rubidium fluoride, rubidium chloride, rubidium bromide, rubidium iodide, cesium fluoride, cesium chloride, cesium bromide, cesium iodide, beryllium fluoride, beryllium chloride, beryllium bromide, beryllium iodide, magnesium fluoride, magnesium chloride, magnesium bromide, magnesium iodide, calcium fluoride, calcium chloride, calcium bromide, calcium iodide, strontium fluoride, strontium chloride, strontium bromide, strontium iodide, barium fluoride, barium chloride, barium bromide, barium iodide, and combinations thereof. A most preferred matrix salt is sodium chloride.

The matrix salt of the present invention may be included in the precursor composition as a component added in its salt form. Alternatively, the matrix salt may be created in situ in the precursor composition. Either method of providing the matrix salt component to the precursor composition, as well as any combination of methods, is encompassed by the methods of the present invention, provided the methods are carried out under such conditions that a solid phase of the salt is ultimately provided as a template for the nanoporous structure of the particles during spray pyrolysis.

The precursor composition preferably additionally includes at least one reactive salt (the precursor salt). It is reactive in that it decomposes to form, after rinsing, a solid, preferably nanoporous particle; however, the precursor salt is generally nonreactive with the matrix salt. Preferred precursor salts, or combination of salts, are those capable of being spray pyrolyzed at a temperature below the melting point of the chosen matrix salt to form particles.

The precursor composition may be spray pyrolyzed under conditions effective to provide metal nanoporous particles. Alternatively, the precursor composition may be spray pyrolyzed under conditions effective to provide metal oxide nanoporous particles.

To provide the preferred nanoporous particles of the invention, it is important that the precursor salt and the matrix salt are chosen such that the precursor salt decomposes at a temperature below the melting point of the matrix salt. Suitable precursor salts and matrix salts are also capable of being spray pyrolyzed from a precursor composition. Typical preferred precursor salts of the invention are those that decompose at temperatures from about 200° C. to about 600° C. Additionally, preferred precursor salts typically are more soluble, at room temperature, in the vehicle of the precursor composition than the selected matrix salt of the precursor composition.

Preferred precursor salts of the invention include salts selected from the group of Group IIIA metal salts, Group IVA metal salts, Group VA metal salts, Group VIA metal salts, Group VIIA metal salts, transition metal salts, and combinations thereof. The Group IIIA-Group VIIA metal salts, particularly the Group VIA and Group VIIA metal salts include salts of those elements understood by those skilled in the art to be metalloids. Metalloids show characteristics of both metals and nonmetals, and include silicon, arsenic, tellurium, and antimony. Transition metal salts are metal salts including metals chosen from Group IB, Group IIB, Group IIIB, Group IVB, Group VB, Group VIB, Group VIIB, and Group VIII of the Periodic Table.

Anions useful in preferred precursor salts are those that form a salt with the selected metal to provide a precursor composition of the invention, and that provide the desired metal or metal oxide particle upon spray pyrolysis of the precursor composition. Preferred anions are nitrates, carbonates, and acetates. More preferred anions are nitrates.

More preferred precursor salts include salts selected from the group of Group IIIA metal salts, Group IVA metal salts, Group VA metal salts, and combinations thereof. Even more preferred precursor salts are salts selected from Main Group IIIA metal salts. A particularly preferred precursor salt is aluminum nitrate.

The precursor composition can also include a carrier (i.e., a precursor vehicle), such as water, or any other carrier known in the art that has a boiling point lower than the decomposition temperature of the precursor salt and will at least partially solubilize both the precursor salt and the matrix salt. The precursor vehicle may be any material capable of providing a vehicle for the precursor salt and the matrix salt and which is capable of evaporating upon spray pyrolysis. Preferably the precursor composition is an aqueous precursor composition.

Total salt concentration of the precursor also is believed to affect the size and porosity of the particle produced. For instance, by changing the total salt concentration (i.e., both precursor salt and matrix salt combined in a preferred mole ratio) in the precursor composition, the size of the resultant particle may be manipulated. For example, a relatively lower concentration of total salts in a precursor composition typically produces smaller particles as compared with aerosolized droplets of comparable size of a precursor composition including a relatively higher concentration of total salts, as the lower concentration of salt has less starting material for pyrolyzation. Therefore, the desired particle size may be produced by choice of total salt concentration. In preferred methods of the present invention, the concentration of total salts present in the precursor composition is preferably no greater than about 3 weight percent, based on the total weight of the composition, as salt concentrations of greater than about 3 weight percent typically form hollow particles rather than nanoporous particles. More preferably, the concentration is at least about 1 weight percent, based on the total weight of the composition.

Additionally, the final particle structure is believed to be affected by the mole ratio of the precursor salt to the matrix salt present in the precursor composition. For instance, a relatively low matrix salt fraction may yield substantially nonporous particles, as there is a relatively small amount of material to form the matrix structure. On the other hand, a relatively high matrix salt fraction may cause the formation of large structures, leading to particles with a pore structure that is larger than the desired nanoporous structure of the present invention. Preferred precursor compositions of the present invention include compositions having a mole ratio of precursor salt to matrix salt that is at least about 1:1. Additionally, preferably the mole ratio of precursor salt to matrix salt in the precursor composition is no greater than about 1:5. More preferably the mole ratio is no greater than about 1:3.

The precursor composition is spray pyrolyzed at a temperature that is greater than the decomposition temperature of the precursor salt but lower than the melting point of the matrix salt. Preferred pyrolysis temperatures of the invention are at least about 200° C. and preferably no greater than about 700° C. More preferably, spray pyrolysis temperatures are no greater than about 550° C.

Without being bound to any particular theory, it is believed that the drying rate of the spray pyrolyzed precursor composition may have an effect on the nanoporous structure of the nanoporous particles of the invention. The drying rate may be controlled through the relative humidity of the spray pyrolysis environment. Preferred methods of the invention, therefore, include spray pyrolyzing the precursor composition at humidities of at least about 50% relative humidity and, preferably, no greater than about 80% relative humidity.

Without being bound to any particular theory, it is believed that the process and conditions of evaporating the droplets of nebulized precursor composition and solidification of the particles during spray pyrolysis, manipulated through a change in pyrolysis temperature and relative humidity of the pyrolysis environment, are significant in the methods of forming the nanoporous particles of the present invention. For instance, it is believed that gradual shrinkage of nebulized precursor, which may be effected through lowering the evaporation rate, tends to promote the formation of solid, rather than hollow particles. Additionally, the concentrations of the salts, particularly the relative concentrations of the precursor and matrix salts in the precursor composition, and how they precipitate in the aerosolized and pyrolyzed precursor droplets, are believed to affect the structure and porosity of the final particle.

Although the inventors do not wish to be bound by theory, it is believed that in an evaporating droplet of the precursor composition, the salt concentration will eventually reach a supersaturated state and begin to nucleate. As the loss of the liquid phase of the composition occurs first at the drop surface, it is here that the salt typically will be present in the highest concentration. If the evaporation rate is rapid relative to the internal liquid state diffusion of solutes, precipitation of the salts near the edge of the droplet may result in the formation of a crust. Such formation has the potential to subsequently form hollow structures. If, however, the salts are allowed to diffuse to the interior of the droplet, particularly by slowing the evaporation rate of the precursor droplets relative to the internal liquid state diffusion of solutes, it is believed that the matrix salt is able to form a template for nanoporous structures in the spray pyrolyzed particles.

It is further believed that the nature of the precipitation of the salts, particularly order of precipitation of the matrix salts and precursor salts within the droplet, is intimately connected to the generation of the template for the porous network. The exact nature of the precipitation process of the salts is believed to be quite complex; however, it is expected that by choosing a matrix salt to have a lower solubility relative to that of the chosen precursor salt, the matrix salt will precipitate first, aiding in production of a nanoporous template structure.

It is also believed that the location of the precipitated salts in the pyrolyzed particles may have an effect on the particle's structure and porosity. Once precipitation is complete, the formation of the porous network by the methods of the present invention is effectively also complete, since the salts are no longer able to move. The matrix salt may thereby provide a template of the nanoporous structure of the final particle, or a template of another type of structure, depending upon where in the particle the matrix salt precipitates. The location of the precipitated salts within the precursor droplet is expected to depend significantly upon the exact nature of the drying rate relative to the internal droplet diffusion processes. In the present methods, the drying rate is typically determined by the relative humidity at which the particles are spray pyrolyzed.

Without being held to a particular theory, it is also believed that the initial precursor composition droplet size affects the morphology of the final particle at post-washing due to solubility and relative diffusion rate of the precursor composition salts. Most notably in this regard, the formation of hollow particles in pyrolyzed particles with diameters of greater than about 100 nanometers and less than about 500 nanometers, obtained from larger initial droplet sizes, is believed to result from incomplete decomposition of the precursor, particularly when pyrolyzed at lower temperatures, and from non-uniform solute distribution, presumably resulting from insufficient time for the solute to diffuse into the interior of a large droplet.

Figure 2:
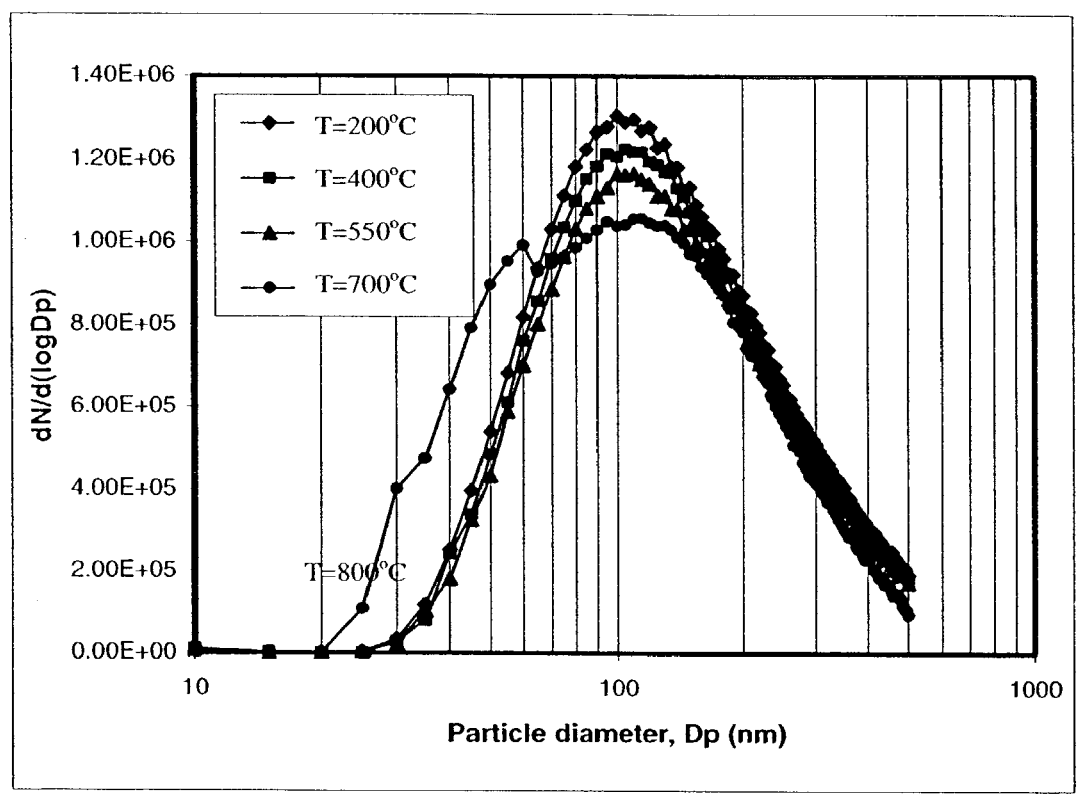
FIG. 2—The evolution of final particle size distribution as a function of furnace temperature.

The initial size of the droplets generated by the nebulizer is related to the size of the final product particle. For instance, a nominally 700 nanometer droplet of a precursor composition having a concentration of about 1 weight percent salts, based on total weight of the precursor composition, is estimated to produce a final product particle at full density, assuming a nanoporous structure, of about 90 nanometers. This estimation is verified by experimental data reported in FIGS. 1 and 2. The initial droplet size measured showed that the nominal diameter of an initial droplet that is generated by the nebulizer is about 710 nanometers, as shown in FIG. 1. The final particle size distribution of the nebulized precursor, as measured by the Differential Mobility Particle Sizer (Knutson, E. O.; Whitby, K. T.; *J. Aerosol Sci.*, 6:453-460 (1975)) at various furnace temperatures, is shown in FIG. 2 to be about 100 nanometers. This dimension is in reasonable agreement with the expected calculated diameter of 90 nanometers, indicated above. This dimension also indicates that hollow particles were typically not produced, as a hollow particle produced from a comparable initial precursor droplet size would typically have a larger diameter. Therefore, in the preferred methods of the present invention, the diameter of the initial droplet of precursor composition provided by spray pyrolysis is at least about 700 nanometers.

Depending on the precursor composition and environmental conditions, therefore, it is believed that a crust of the matrix salt may be formed at the periphery of the particle. Under certain conditions, such pyrolyzed precursor droplets may yield substantially nonporous nanoparticles. Alternatively, under different pyrolysis conditions and precursor compositions, formation of a crust may instead lead to hollow-structured metal oxide particles. For preferred environmental and precursor composition conditions of the invention, however, the matrix salt typically diffuses into the particles' interior, generally yielding the preferred nanoporous particle structure.

Generally, the formation of a matrix salt crust, which may produce nonporous or hollow particles, or the diffusion of the matrix salt to the particles' interior to form a nanoporous template structure is believed to constitute a competition between matrix salt diffusion and evaporation of the aqueous precursor composition (or droplet shrinkage). This competition may be evaluated through a comparison of characteristic time constants (Seinfeld et al., *Atmospheric Chemistry and Physics*, John Wiley & Sons, Inc., (1998)) such as those presented in Table 1.

TABLE 1

Comparison of characteristic time constants for water droplets relative to heat conduction in air at T = 25° C.

| Process | Characteristic times (sec) |
| --- | --- |
| Vapor diffusion [1]($t_{vd}$) | $2.02 \times 10^{-8}$ |
| Droplet shrinkage [2]($t_r$) | $1.69 \times 10^{-4}$ |
| Solute diffusion [3]($t_{sd}$) | $3.49 \times 10^{-4}$ |

TABLE 1-continued

Comparison of characteristic time constants for water droplets relative to heat conduction in air at T = 25° C.

| Process | Characteristic times (sec) |
|---|---|
| Heat conduction in air [4]($t_{hg}$) | $2.23 \times 10^{-7}$ |
| Heat conduction in droplet [5]($t_{hl}$) | $3.41 \times 10^{-6}$ |

[1]$t_{vd} = d_p^2/D_v$, R = droplet radius [cm], $D_v$ = diffusivity of solvent vapor in air [cm$^2$s$^{-1}$], where, R is assumed to be 350 nm, which was measured by laser spectrometry

[2]$t_r = \dfrac{R_u T \rho_p d_p^2}{8 D_v M(p_d - p_\infty)}$, $\rho_p$ = density of liquid phase [gcm$^{-3}$], $R_u$ = universal constant, $D_v$ = diffusion coefficient of water vapor, M = molecular weight of water, $p_d$ = partial pressure of solvent vapors on the droplet, $p_\infty$ = partial pressure of solvent vapors far from the droplet

[3]$t_{sd} = d_p^2/D_l$, $D_l$ = diffusivity of solute in liquid phase [cm$^2$s$^{-1}$],

[4]$t_{hg} = d_p^2/\alpha_g$, $\alpha_g$ = thermal diffusivity in the gas phase [cm$^2$s$^{-1}$],

[5]$t_{hl} = d_p^2/\alpha_l$, $\alpha_l$ = thermal diffusivity in the liquid phase [cm$^2$s$^{-1}$]

Table 1 shows that salt diffusion and droplet shrinkage, manipulated through, for instance, precursor evaporation rates, are clearly the slowest processes among various mechanisms that occur during spray pyrolysis. Further, they both require sufficiently comparable amounts of time for completion such that a change in process parameters may have an effect on the predominance of one mechanism over the other.

Manipulation of the matrix salt diffusion and precursor evaporation rates may be effected by varying spray pyrolysis conditions. Such conditions include dwell time in the dryer and furnace; the nebulized droplet size; drying conditions, through regulation of relative humidity; and pyrolysis temperature. Matrix salt diffusion and precursor evaporation may also be manipulated through the conditions of the precursor composition, as previously indicated, such as total salt concentration and/or the mole ratio of precursor salt to matrix salt in the precursor composition. Without being bound to any particular theory, it is believed that manipulation of the above pyrolysis conditions and precursor compositions play significant and, particularly, interrelated roles in determining the particles' final nanoporous structure.

Spray Pyrolysis and Characterization of Precursor Compositions

Figure 3:
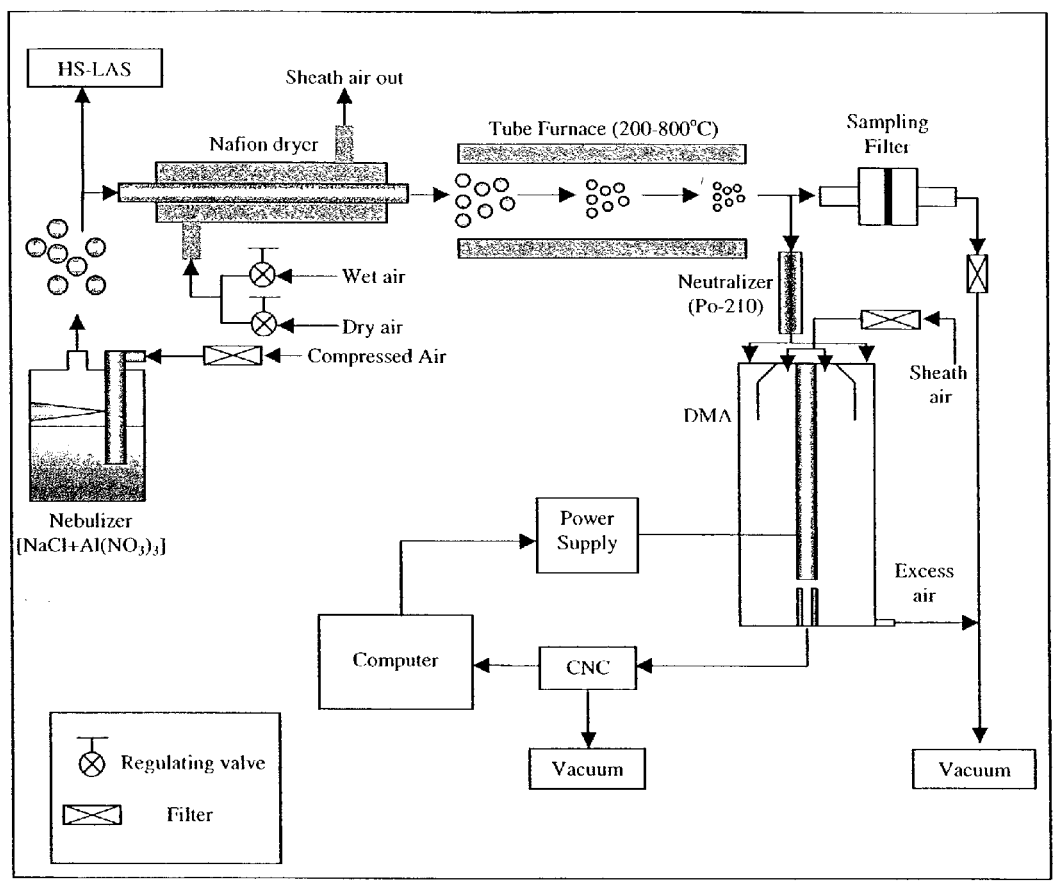
FIG. 3—Schematic diagram of experimental setup for synthesis and characterization of nanoporous particles (DMA:Differential Mobility Analyzer, CNC:Condensation Nuclei Counter, HS-LAS:High Sensitivity Laser Aerosol Spectrometer).

FIG. 3 presents a schematic diagram of a preferred method for forming and characterizing nanoporous particles produced from a precursor composition of the present invention. This method includes spray pyrolysis of the precursor composition. For spray pyrolysis, generally, a nebulizer is used to generate aerosol droplets of the precursor composition (e.g., a precursor composition including NaCl and Al(NO$_3$)$_3$). The nebulizer may be constructed (May, K. R., "The Collison Nebulizer. Description, Performance & Application," *Journal of Aerosol Science*, 4(3):235 (1973)), or a commercially available model, such as a Collison type may be used. The droplets are carried by a carrier gas to a dryer and tube furnace where the droplets are dried in a controlled relative humidity environment and exposed to heat in a furnace at temperatures of preferably about 200° C. to about 800° C. and at dwell times of typically about 1 second to about 0.5 seconds, respectively, to form spray pyrolyzed particles of the precursor composition. Preferred dwell times in the dryer and furnace are typically longer than the decomposition time required for the precursor composition, to allow sufficient time for diffusion of the matrix salt within the droplet. Preferred dwell times are typically less than about 5 seconds.

Conventional methods known in the art may then be used to measure the particle sizes. Alternatively, a real-time method using a Differential Mobility Analyzer and Condensation Nuclei Counter may be used to monitor the evolution and particle size distribution of the of the spray pyrolyzed particles produced at, for instance, various temperature relative humidity conditions (Fissan et al., *J. Aerosol. Sci.*, 14:354 (1983)).

The product particles produced by the preferred methods of the invention may then be characterized by methods known in the art, such as by using scanning electron microscopy (SEM), transmission electron microscopy (TEM), Powder X-ray diffractometry, Fourier Transform Infrared Spectroscopy (FT-IR), Thermal Gravimetric Analysis (TGA), and Gas Sorptometry.

EXAMPLES

Decomposition Temperatures of a Preferred Matrix Salt

Conversion of precursor salt in the precursor composition to the pyrolyzed particles requires elevated temperatures. It was believed, however, that preferred nanoporous particles can be formed at a temperature below the decomposition temperature of the matrix salt, which is approximately 800° C. for the preferred matrix salt sodium chloride. Therefore, to test stability of spray pyrolyzed sodium chloride, particle size distributions of spray pyrolyzed sodium chloride at various temperatures were produced. A precursor composition of sodium chloride, without any precursor composition, was nebulized and spray pyrolyzed at temperatures of about 550° C., about 600° C., and about 700° C. The size distributions of the resultant particles as a function of furnace temperature are reported in FIG. 4, which indicates, for the temperatures tested, that the sodium chloride particles remained most stable for pyrolysis temperatures temperatures of about 550° C.

Examples 1-3 were performed to examine the effect of controlling salt diffusion by varying the evaporation rates of the precursor composition. To investigate the formation of the porous network at varied evaporation rates, the relative humidity of the sheath air in the counter-current NAFION membrane dryer (E.I. du Pont de Nemours, Wilmington, Del.; as shown in FIG. 3) was varied. The NAFION dryer was constructed with an inner tubular membrane for nebulized droplet flow and outer tube for sheath flow to absorb water vapor. By controlling the relative humidity of the sheath flow, it was possible to change the mass-transfer driving force for evaporation. The relative humidity of aerosolized droplets was measured to be about 95% at the nebulizer outlet and was varied from about 80% relative humidity (low evaporation rate) to a minimum of about 50% relative humidity (high evaporation rate), as measured by a relative humidity transducer at the outlet of the NAFION (E.I. du Pont de Nemours, Wilmington, Del.) dryer. The relative humidities were varied by supplying various ratios of dry/wet air through the outer tube.

Example 1

Aluminum oxide particles having a nanoporous structure were prepared by thermal decomposition of droplets of an aqueous precursor composition including aluminum nitrate and sodium chloride.

The precursor composition was prepared by dissolving Al(NO$_3$)$_3$.9H$_2$O and NaCl at room temperature in deionized water at a mole ratio of about 1:1 and a total salt concentration of about 1 weight percent, based on the total weight of the composition. The precursor composition was then spray pyrolyzed according to the following procedure.

To generate the precursor aerosol droplets, a Collison nebulizer (May, K. R., "The Collison Nebulizer. Description, Performance & Application," *Journal of Aerosol Science*, 4(3):235 (1973)) was employed, set at a droplet flow rate of approximately 1 liter per minute (L/min (35 psi)). The initial droplet size was measured using a high sensitivity laser aerosol spectrometer (Model HSLAS, Particle Measuring Systems, Inc., Boulder, Colo.) capable of measuring particle sizes between 65 nm and 900 nm with a He—Ne optical particle counting system. Aerosol precursor droplets of approximately 800 nm were generated by the Collison nebulizer and carried by compressed air to a NAFION (E.I. du Pont de Nemours, Wilmington, Del.) silica-gel diffusion dryer where the droplets were dried for at least about 5 seconds to remove water from the aerosolized precursor droplets. Air was flowed through the dryer at a relative humidity of approximately 80% at the dryer outlet port.

The dried solid aerosols were then carried by air current to a stainless steel reaction tube (122 centimeters (cm) long, 1.6 cm in diameter) within a Linburg tube furnace (Burton Industries, Inc., North Babylon, N.Y.) operating at a temperature of about 550° C., to generate the aluminum oxide/sodium chloride composite particles.

A Differential Mobility Particle Sizer (Knutson, E. O.; Whitby, K. T.; *J. Aerosol Sci.*, 6:453-460 (1975)) was then used to monitor in real time the evolution of particle size distribution. The mixed Al$_2$O$_3$ and NaCl particles were then collected on a nucleopore filter at a temperature of 25° C., providing a particle production rate of 100 milligrams per hour (mg/hr). The particles were then rinsed with water to provide the nanoporous alumina product using a washing procedure as outlined by B. Holland; C. Blanford; A. Stein, "Synthesis of macroporous minerals with highly ordered three-dimensional arrays of spheroidal voids," Science, 281: 538-540 (1998).

The resulting pore surface area and volume distribution data of the particles produced are provided in both FIGS. 5(a) and 5(b) and FIGS. 6(a) and 6(b).

Example 2

Aluminum oxide particles were produced by the method of Example 1, except that the relative humidity at the dryer outlet was about 65%. The resulting pore surface area and volume distribution is provided in FIGS. 5(a) and 5(b).

Example 3

Aluminum oxide particles were produced by the method of Example 1, except that the relative humidity at the dryer outlet was about 50%. The resulting pore surface area and volume distribution is provided in FIGS. 5(a) and 5(b).

Figure 5:
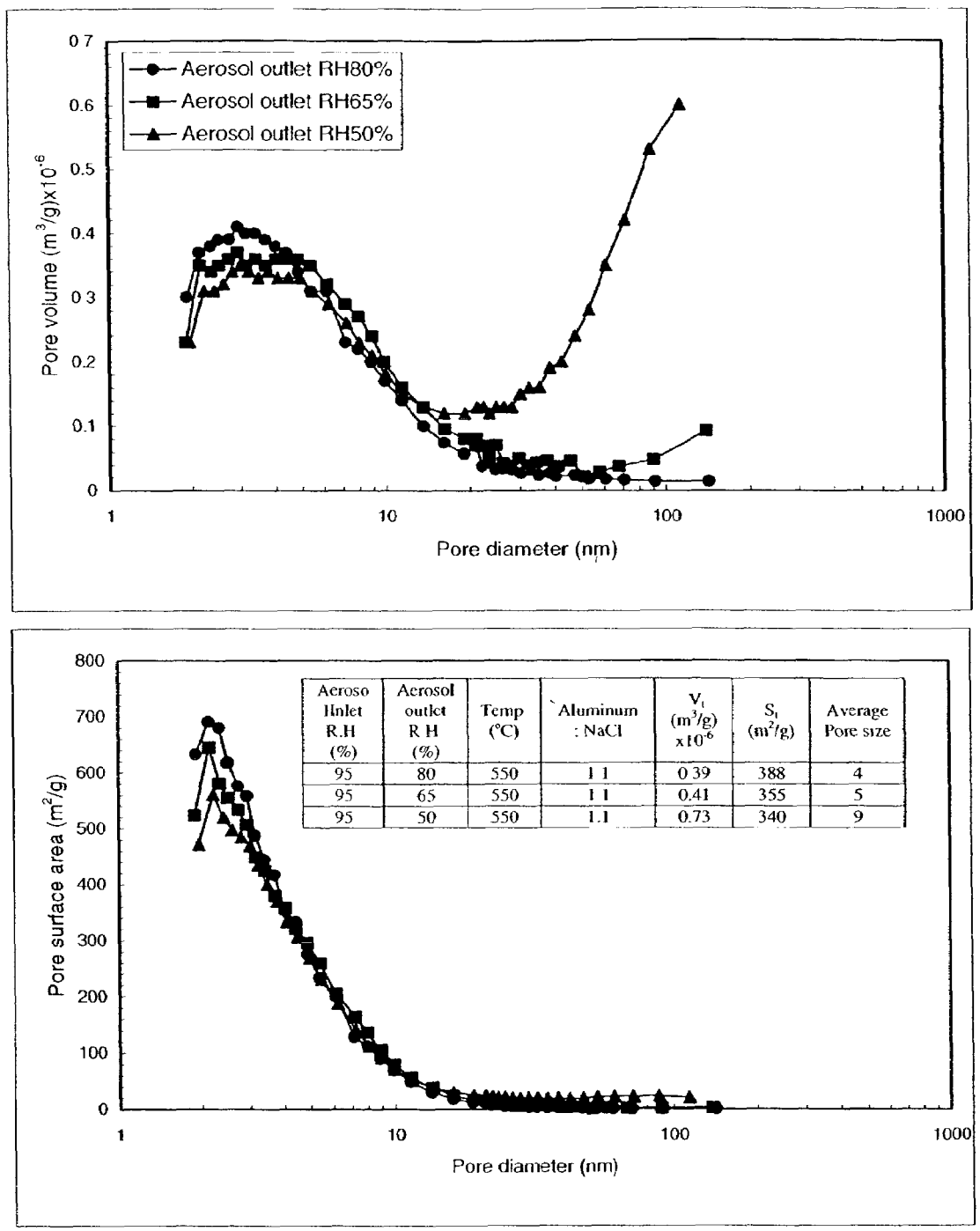
FIG. 5—Pore surface area and volume distribution for various drying rate conditions (post salt removal).

As indicated by Examples 1-3, varying evaporation rates through manipulation of relative humidities had a significant effect on the structure of the resulting particles. FIG. 5 reports the resultant pore volumes and pore surface areas of nanoporous particles produced at various relative humidities. Higher rates of droplet evaporation (at lower relative humidities) are believed to result in particles having larger pore diameters than particles produced at higher relative humidities. However, the larger average pore diameters seen at higher droplet evaporation rates occurred typically at the higher end of the pore diameter measurements and were associated with the formation of hollow-like structures. As shown in FIG. 5, there is a trend toward the formation of greater pore volume in the particles having smaller pores (about 2 to about 10 nanometers) with a higher relative humidity (decreased drying rate), indicating that in the preferred methods of the present invention, the precursor composition is spray pyrolyzed at a relative humidity that is preferably at least about 50%, more preferably at least about 65%, and preferably at a relative humidity of no greater than about 80%.

Figure 7:
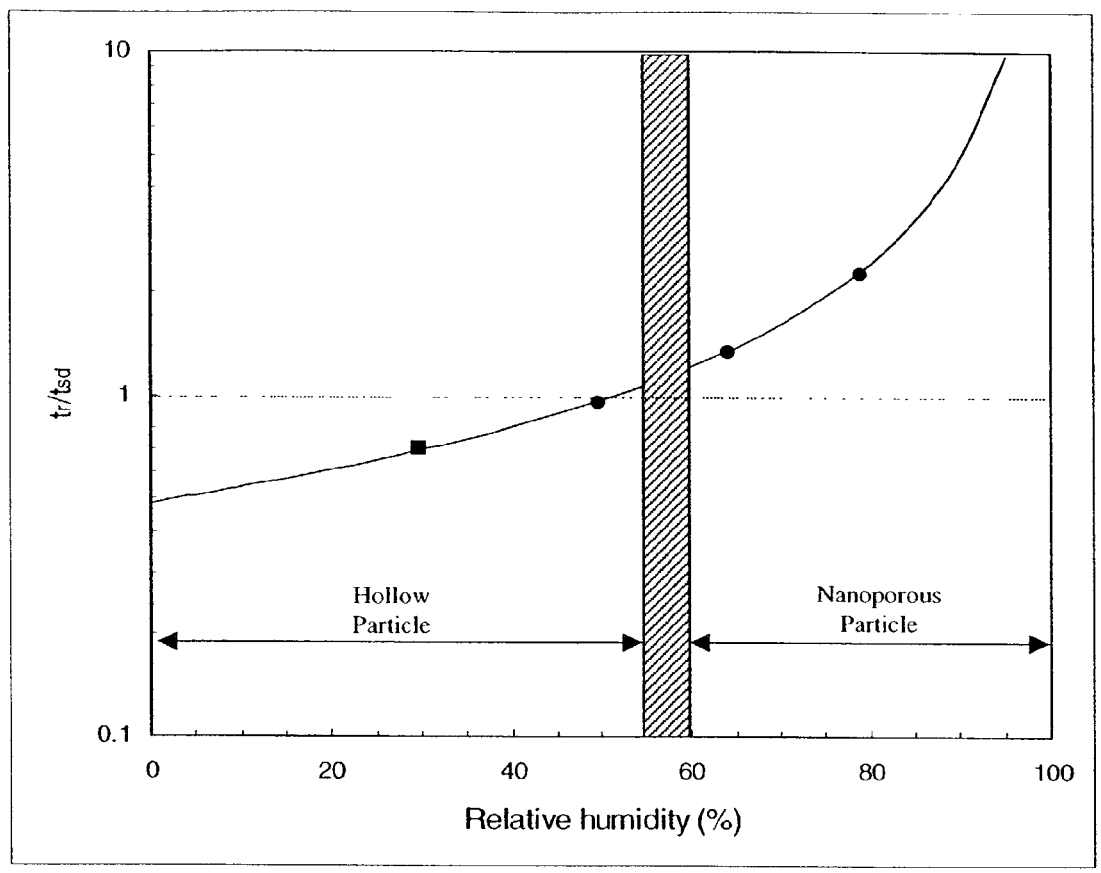
FIG. 7—Ratio of characteristic time for droplet shrinkage to solute diffusion, as a function of relative humidity ($t_1$=characteristic time for droplet shrinkage, $t_{sd}$=characteristic time for solute diffusion; ●=Nafion membrane dryer, ■=silica-gel diffusion dryer).

Without being held to any particular theory, it is believed that a certain amount of control of the competition between salt diffusion and precursor composition evaporation is accomplished by a change in relative humidity. In a high relative humidity environment, typically above about 60% relative humidity, at room temperature and pressure, highly porous structured particles are typically produced without the formation of hollow-structured particles due, presumably, to a reduction of crust formation. In FIG. 7, the ratio of the characteristic time of droplet shrinkage ($t_r$) to that of salt diffusion ($t_{sd}$) within the precursor droplet is plotted as a function of relative humidity. The curve crosses unity at a relative humidity of about 50%, under the assumption that the vapor pressure of water is typically generally unaffected by the salt. At low relative humidity (less than about 50%), the characteristic evaporation time is shorter than the internal droplet transport processes. This is expected to produce a non-uniform salt profile within the droplet and, correspondingly, a high precipitation rate near the surface. These conditions are expected to lead to a hollow particle and, in fact, hollow particles are observed under these conditions (FIG. 5(a)).

Conversely, at a higher relative humidity (over about 60% relative humidity), the ratio of characteristic times shown in FIG. 7 is larger than one, and at these higher relative humidities, more uniform porous particles are observed (FIG. 5(a)).

It is further believed that varying the ratio of precursor salt to matrix salt in the precursor composition has an effect on the resultant structure of the pyrolyzed particle. Therefore, particles were produced according to Examples 4-7, varying the salt ratios of the precursor composition, to demonstrate how the resultant particles are affected. Resulting pore surface area and volume distribution data for Examples 4-7 are provided in FIGS. 6(a) and 6(b).

Example 4

Aluminum oxide particles were produced by the method of Example 1, except that the mole ratio of aluminum nitrate to sodium chloride was 1:0.

Example 5

Aluminum oxide particles were produced by the method of Example 1, except that the mole ratio of aluminum nitrate to sodium chloride was about 1:0.5.

Example 6

Aluminum oxide particles were produced by the method of Example 1, except that the mole ratio of aluminum nitrate to sodium chloride was about 1:3.

Example 7

Aluminum oxide particles were produced by the method of Example 1, except that the mole ratio of aluminum nitrate to sodium chloride was about 1:5.

Figure 6:
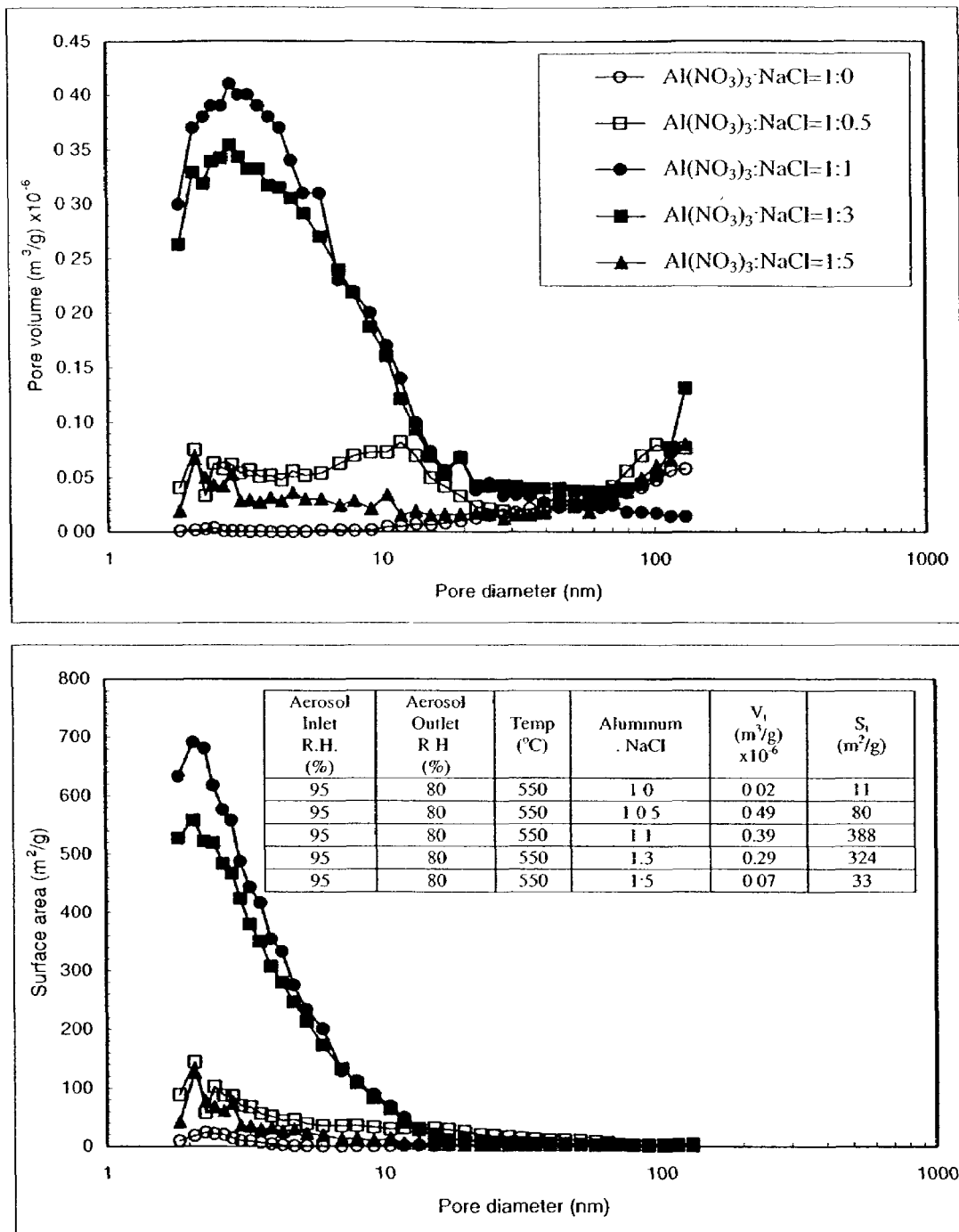
FIG. 6—The evolution of (a) pore surface area and (b) pore volume distribution of $Al_2O_3$ for varying mixture ratio of aluminum and salt (post salt removal).

As indicated by FIGS. 6(a) and 6(b), the particles produced by the method of Example 4 yielded substantially nonporous aluminum particles for spray pyrolysis of a precursor composition without a matrix salt. Additionally, the particles produced by the methods of Examples 5 and 7, using precursor compositions including mole ratios of precursor salt to matrix salt of about 1:0.5 and about 1:5, respectively, typically did not produce the desired nanoporous particles of the invention. For instance, for a precursor composition having a mole ratio of about 1:5 precursor salt to matrix salt, it was shown that the increase in mass fraction of the matrix salt over, for example, the about 1:3 precursor salt to matrix salt precursor composition of Example 6, resulted in a decrease of the specific surface area of the resultant particles and enhanced the formation of substantially nonporous particles.

However, the method of Example 6, using a precursor composition including a mole ratio of about 1:3 precursor salt to matrix salt provided nanoporous particles comparable to those produced by the precursor composition and method of Example 1.

Without being held to any particular theory, it is believed that a relatively small matrix salt fraction, such as a mole fraction of about 1:1 precursor salt to matrix salt, supports the porous, preferably nanoporous, network inside the particle. With relatively larger matrix salt mass fractions, such as a mole ratio of about 1:5 precursor salt to matrix salt, the resulting composites would presumably have larger salt precipitates, resulting in, upon removal of salt, relatively fewer small size pore volumes and decreased surface area. Higher matrix salt fraction composites presumably form substantially nonporous metal nanoparticles (Ehrman et al., *J. Mater. Res.*, 14(4):1664 (1999); Xia et al., *Adv. Mater.*, 13(20):1579 (2001)). As indicated in FIG. 8(a), the maximum surface area for the preferred nanoporous particles of the present invention produced from a precursor composition with a mole ratio of aluminum nitrate to sodium chloride of about 1:1 in concentration of about 1 weight percent, based on total weight of the composition, was determined to be approximately 388 meters squared per gram.

It is further believed that preferred methods of the present invention include pyrolyzing the precursor composition at a temperature that ensures decomposition of the precursor salt but does not exceed the melting point of the matrix salt. In the methods of Examples 8-12, the precursor composition including aluminum nitrate as the precursor salt and sodium chloride as the matrix salt was pyrolyzed at temperatures from about 200° C. to about 800° C.

Figure 4:
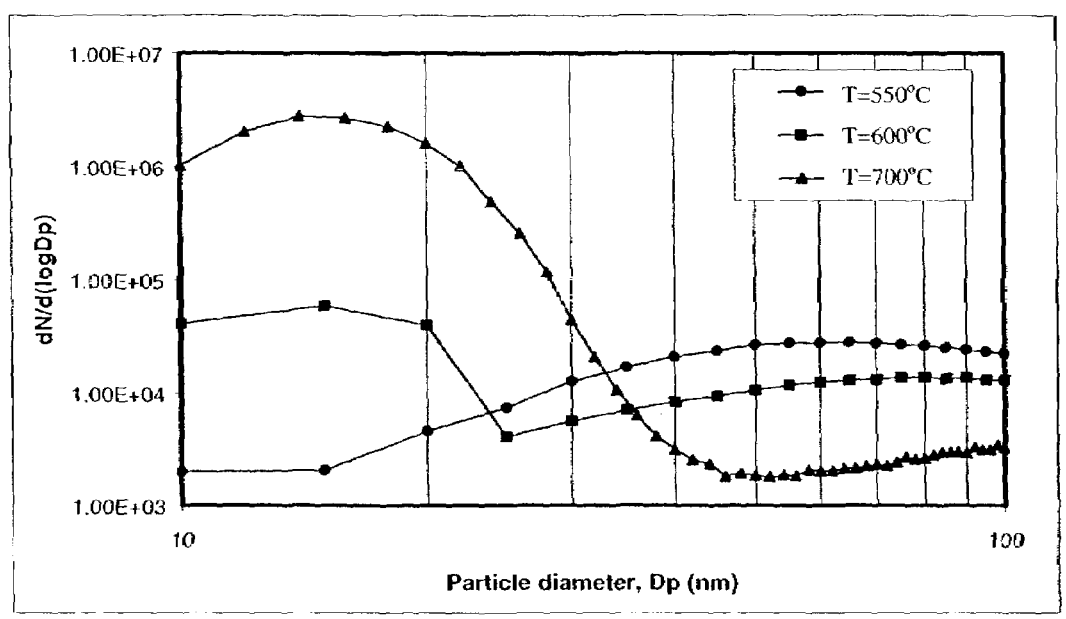
FIG. 4—The evolution of NaCl particle size distribution for varying gas temperatures.

At temperatures below about 800° C., the approximate melting point of sodium chloride, the matrix salt is typically partially to substantially stable. As shown in FIG. 4, the distribution of spray pyrolyzed particles of sodium chloride, the matrix salt remains particularly stable for temperatures below about 550° C. At about 700° C., the mode corresponding to the original aerosol produced by the atomizer is decreased significantly, and is replaced with a nucleation mode aerosol with a very narrow size distribution and a high number concentration. Pyrolysis at such high temperatures is believed to cause a loss of porosity in the nanoporous particles produced by methods of the present invention Additionally, the aluminum nitrate precursor salt generally decomposes at temperatures above about 200° C. Pyrolysis temperatures, therefore, were tested between about 200° C. and about 800° C., a range at which the sodium chloride typically remains generally stable and the aluminum nitrate typically at least partially thermally decomposes.

Example 8

Aluminum oxide particles were produced by the method of Example 1, at a pyrolysis temperature of about 550° C., except that the relative humidity at the dryer outlet was about 30%. The resulting pore surface area and volume distribution is provided in FIGS. 8(a), 8(b), and 9(b).

Example 9

Aluminum oxide particles were produced by the method of Example 8, except that the pyrolysis temperature was about 200° C. The resulting pore surface area and volume distribution is provided in FIGS. 8(a) and 8(b).

Example 10

Aluminum oxide particles were produced by the method of Example 8, except that the pyrolysis temperature was about 700° C. The resulting pore surface area and volume distribution is provided in FIGS. 8(a) and 8(b).

Example 11

Aluminum oxide particles were produced by the method of Example 8, except that the pyrolysis temperature was about 400° C. The resulting pore surface area and volume distribution is provided in FIGS. 8(a) and 8(b).

Example 12

Aluminum oxide particles were produced by the method of Example 8, except that the pyrolysis temperature was about 800° C. The resulting pore surface area and volume distribution is provided in FIGS. 8(a) and 8(b).

By the method of Example 8 it is shown that the maximum total surface area under these precursor evaporation conditions and for this precursor composition occurs at a pyrolysis temperature of about 550° C. Further, under the conditions of this Example, nanoporous particles were produced with the greatest proportion of small pore sizes, relative to the other pyrolysis temperatures tested. For the methods of Examples 9, 10, and 11, pyrolyzed at temperatures of about 200° C., about 700° C., and about 400° C., respectively, nanoparticles apparently may have been formed, although there was a decline in small pore volume relative to the nanoporous particles formed at the intermediate temperature of about 550° C. in each case. In the case of the low pyrolysis temperature of Example 9, about 200° C., the total surface area of the particles was a relative minimum size, presumably due to the aluminum nitrate that was not decomposed and was subsequently washed away with the matrix salt. Particles produced by the methods of Example 10, at about 700° C. also exhibited a small pore volume relative to the nanoporous particles formed at the intermediate temperature of about 550° C., similar to the results found in Example 9. However, in this instance the small pore volume is believed to be the result of losing matrix salt as a result of evaporation and the subsequent collapse of the small pores.

Particles produced by the method of Example 11, at a pyrolysis temperature of about 400° C., typically formed nanoporous particles showing a higher small pore volume relative to the particles produced at the higher and lower temperatures examined. The smaller pore size distribution was comparable to the distribution pattern exhibited by the particles pyrolyzed at about 550° C., but did not have as great a volume at the small pore size.

Particles produced by the method of Example 12, at a pyrolysis temperature of about 800° C., were substantially nonporous oxide particles. This was believed to be due to the total collapse of the porous or hollow structure of the particles as a result of pyrolysis at a temperature near the melting point of the sodium chloride matrix salt and the resulting collapse of the template structure. In this case, when the matrix salt presumably melts, the oxide typically creates its own individual substantially nonporous nanoparticles, rather than a nanoporous metal or metal oxide particle (Ehrman et al., *J. Mater. Res.,* 14(4): 1664 (1999)).

Figure 8:
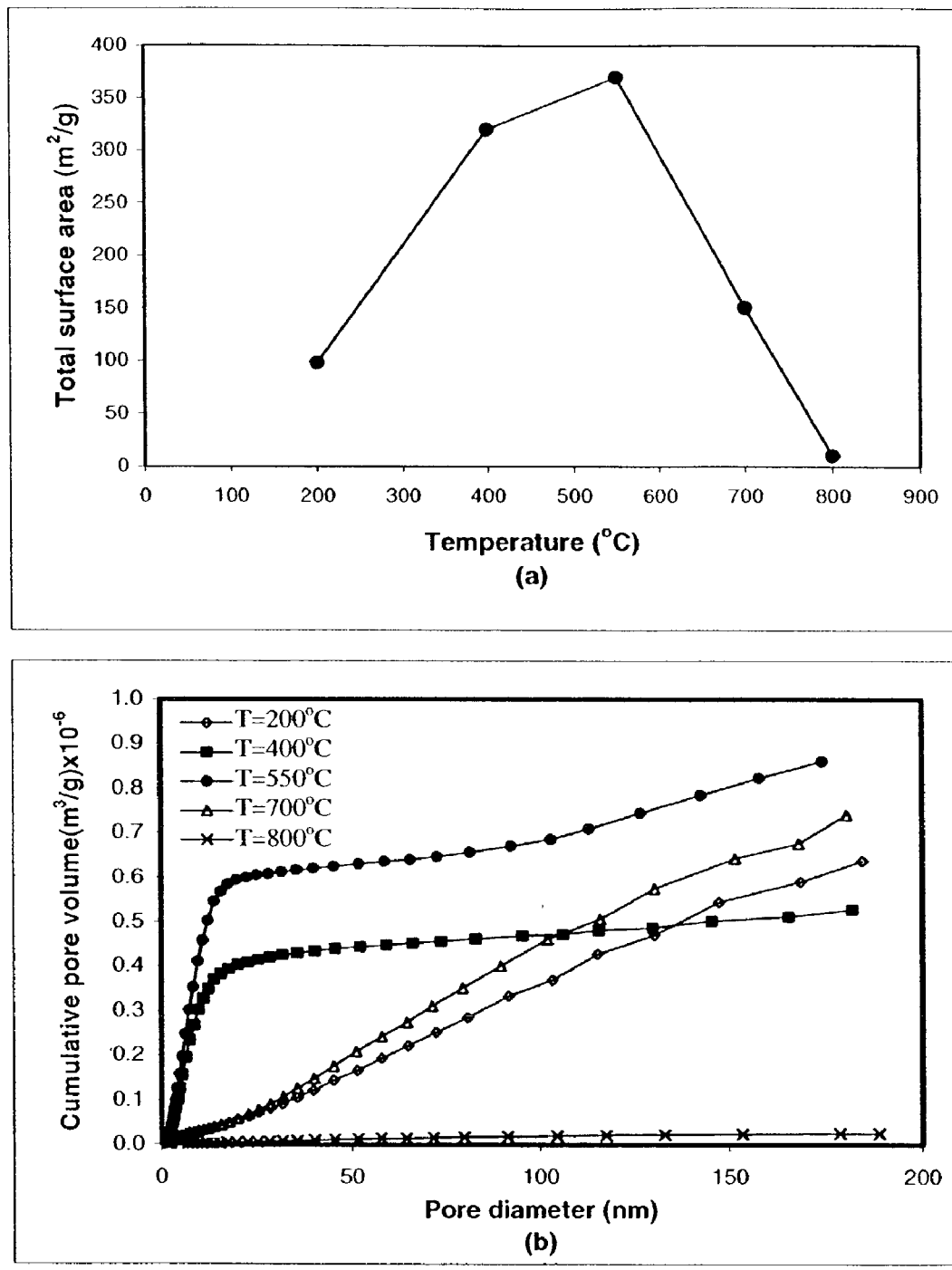
FIG. 8—(a) Total pore surface area and (b) pore volume distribution for varying furnace temperatures ($Al(NO_3)_3$:NaCl=1:1 at 1 weight percent (wt %) solution, relative humidity=30%, post NaCl removal).

FIG. 8(*b*) shows the cumulative pore volume of particles produced at various temperatures from the precursor composition including the matrix salt. It can be seen that the intermediate temperature cases (temperatures of at least about 400° and no greater than about 550° C.) show small pores and moderate pore volume, indicative of a nanoporous particle structure. However, as the temperature is increased above about 550° C., a decline in the small pore volume and an increase in the overall pore volume is seen (with the exception of the very high temperature (about 800° C.) case which shows no increase in overall pore volume). It is believed that at the higher temperatures, such as over about 700° C., matrix salt is generally lost through evaporation and, hence, small pores typically tend to collapse. At the highest temperature recorded (about 800° C., FIG. 8(*b*)) a substantially total collapse of the porous or hollow nature of the particle is observed, presumably because the matrix salt has substantially melted and, therefore, cannot preserve the porous network.

Conversely, at the lower temperature ranges (below about 400° C.), increasing particle surface area is seen, along with larger pore volumes as compared with pore volumes produced in particles pyrolyzed at the intermediate temperatures, such as about 400° C. and about 550° C. (FIGS. 8(*a*) and 8(*b*)). It is believed that particles formed at the lowest temperature (about 200° C.) having large pores, and the increase in surface area with increasing temperature (for temperatures below about 550° C.) is the result of incomplete decomposition, and subsequent loss, of the precursor salt, as well as matrix salt. Incomplete thermal decomposition of the aluminum nitrate may result in some of the aluminum content being leached with the sodium chloride during the washing process. This presumably results in less particle surface area per unit mass.

While each condition identified above is believed to affect the final particle morphology individually, it is also believed that the conditions are additionally interrelated. For instance, without being held to any particular theory, it is believed that the concentration of salts, especially the concentration of the matrix salt, typically affects the size and porosity of the final particle, in particular when considering the processing temperature and the melting point of the chosen matrix salt. For instance, it is believed that if a precursor composition including a matrix salt fraction that is higher than 3 parts matrix salt to 1 part precursor salt is spray pyrolyzed at intermediate temperatures that are generally below the deposition temperature of the precursor salt, the porous structure presumably never forms enough rigidity and can be washed away.

If, on the other hand, the processing takes place at a high temperature (e.g., about 700° C. or greater), above the deposition temperature of the precursor salt and near or above the melting point of the matrix salt, using the same high matrix salt precursor composition, fragments of the metal of the precursor salt may be allowed to nucleate and grow by internal droplet diffusion. These conditions are typically believed to produce, after washing to remove the matrix salt, substantially nonporous nanoparticles (Ehrman et al., *J. Mater. Res.,* 14(4):1664 (1999); Struchtrup et al., *J. Aerosol. Sci.,* 32:1479 (2001); Efendiev et al., *Chem. Eng. Sci.,* 56:5763 (2001)).

Characterization of the Particles

Figure 10A:
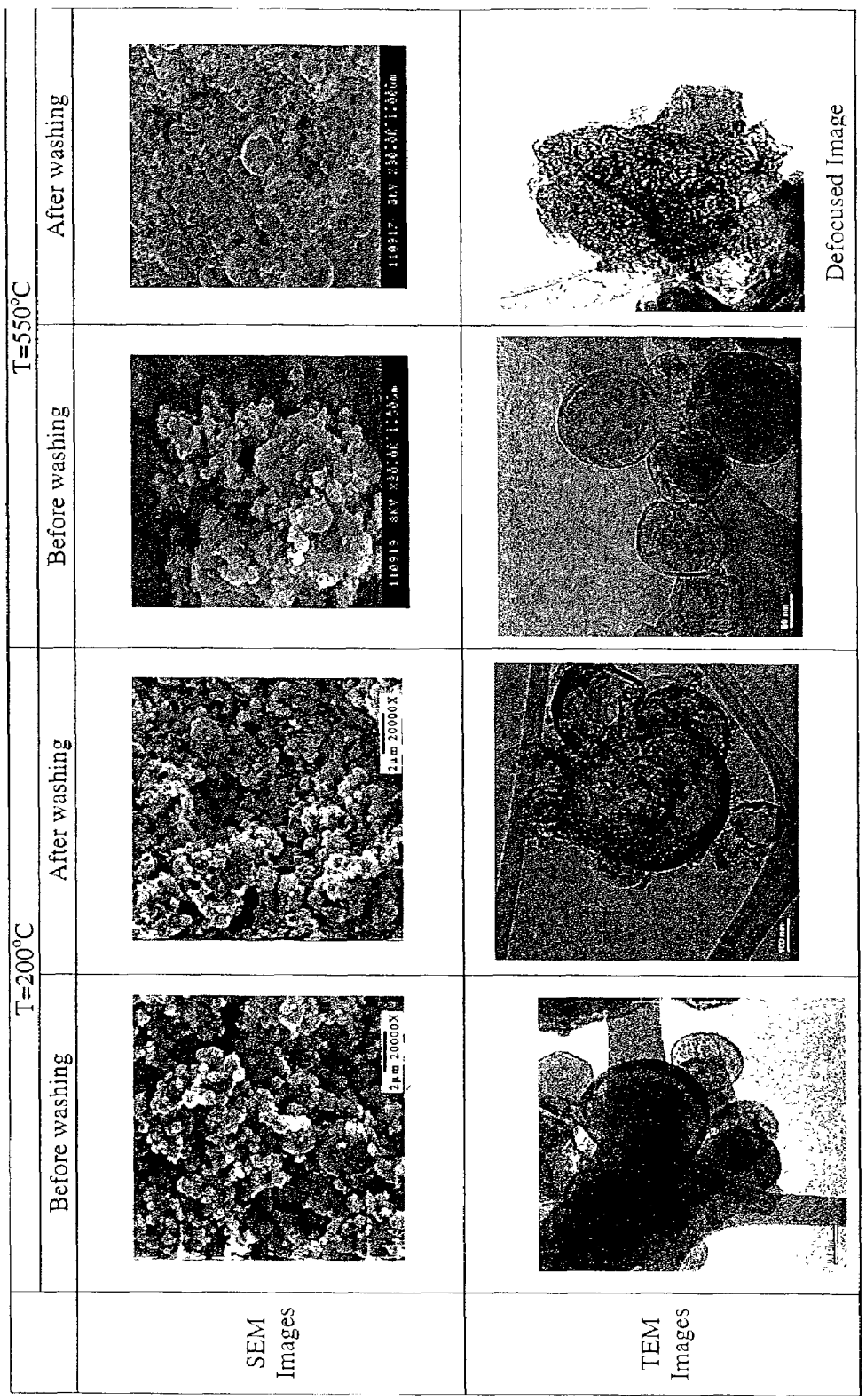
FIG. 10—Scanning Electron Microscopy (SEM) and Transmission Electron Microscopy (TEM) images for varying temperature and salt content.
Figure 10B:
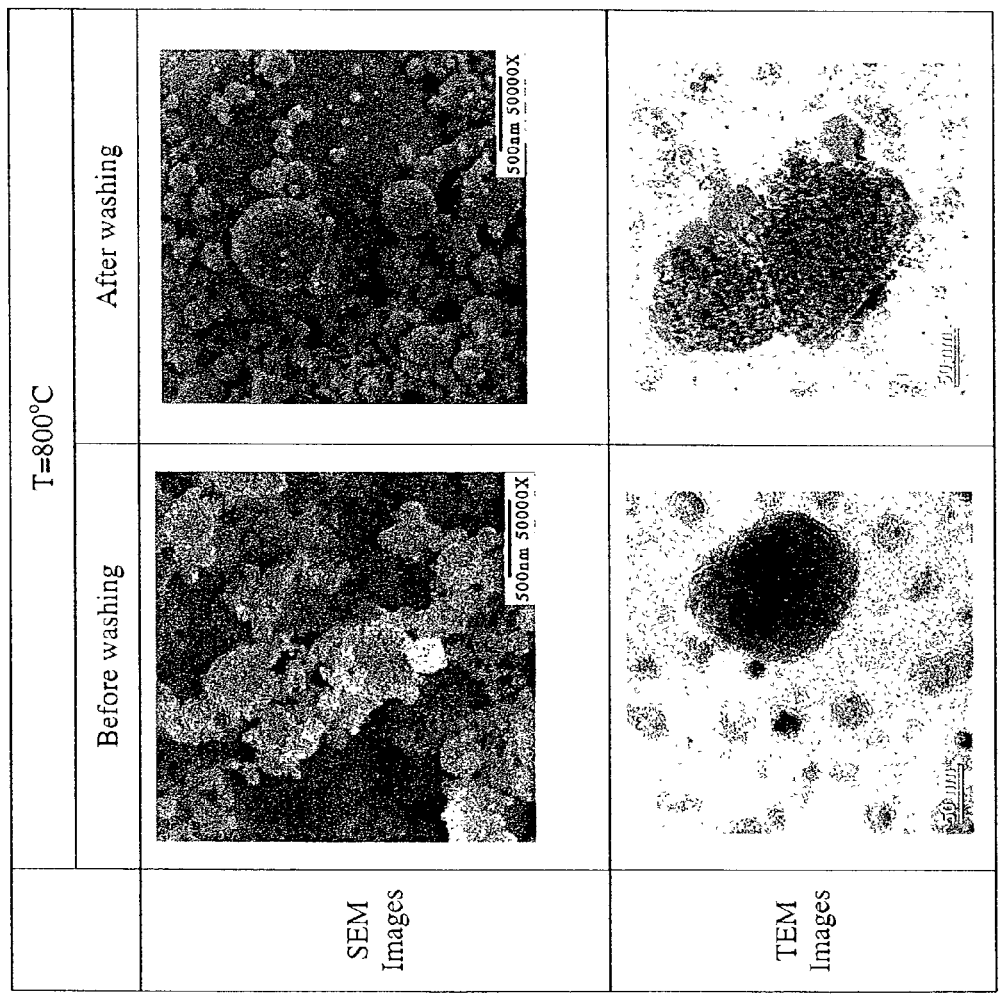

The morphology of nanoporous aluminum oxide particles produced by the Examples of the invention was observed using scanning electron microscopy (SEM; Model S-900, Hitachi Instruments, Inc., Mountain View, Calif.) operated at 8 kilovolts (kV) and transmission electron microscopy (TEM; Model JEOL 1210, Hitachi Instruments, Inc., Mountain View, Calif.) operated at 100 kV. SEM images of the produced composites showed spherical, loosely aggregated particles at temperatures of 200° C., 550° C., and 800° C. (FIG. 10). Following removal of the matrix salt, some particles produced at furnace temperatures of about 200° C. and about 550° C. observed with the SEM showed hollow shapes and seemed to correspond to those that were on the upper end of the particle size distribution (FIG. 2). However, the SEM images of the particles produced at furnace temperatures of about 800° C. showed no hollow spheres, but did show highly spherical, nonporous particles following salt removal, presumably because the matrix salt component of the precursor composition completely evaporated and re-nucleated on the outside of the oxide particles.

The TEM images (FIG. 10) generally did not show significant differences between particles that included the matrix salt and particles following aqueous wash and removal of the matrix salt, indicating that removing the matrix salt does not significantly alter the overall structure of the pyrolyzed particle. Obvious in all the TEM images was a thin crust formed on the outside of the particle, presumably as a result of the precursor evaporation process which lead to high salt concentration gradient and a fast salt precipitation at the surface of the precursor droplet at all temperatures observed. Some slight decrease in the electron beam attenuation is observed in the interior of particles after the matrix salt was removed. This indicates that the matrix salt did reside within the particle interior, as the matrix salt was the only volatile material in the particle. This is corroborated by the observation that the electron beam itself, under concentrated electron bombardment, can result in matrix salt removal and changes in particle structure.

Under normal imaging, the beam optics are focused so as to obtain the sharpest image. In the case of a particle, this corresponds to the focal distance where the diameter of the particle is most clearly defined. However, by defocusing the beam so that the particle is imaged at the surface, information about the particle's surface structure can be deduced. In the present invention the porous structures shown in FIG. 10 are apparent. The particles that were produced at the lowest temperature (about 200° C.), after matrix salt removal, showed highly open, broken shell structures, as if the only structures that remained were thin crusts. This is presumably due to a small amount of the nitrate that was converted to the oxide, and significant amounts of the aluminum nitrate that was carried away with the aqueous wash. Additionally, at the highest temperature (about 800° C.), the interpretation was not clear, since at that temperature the pore structure had collapsed.

Figure 9:
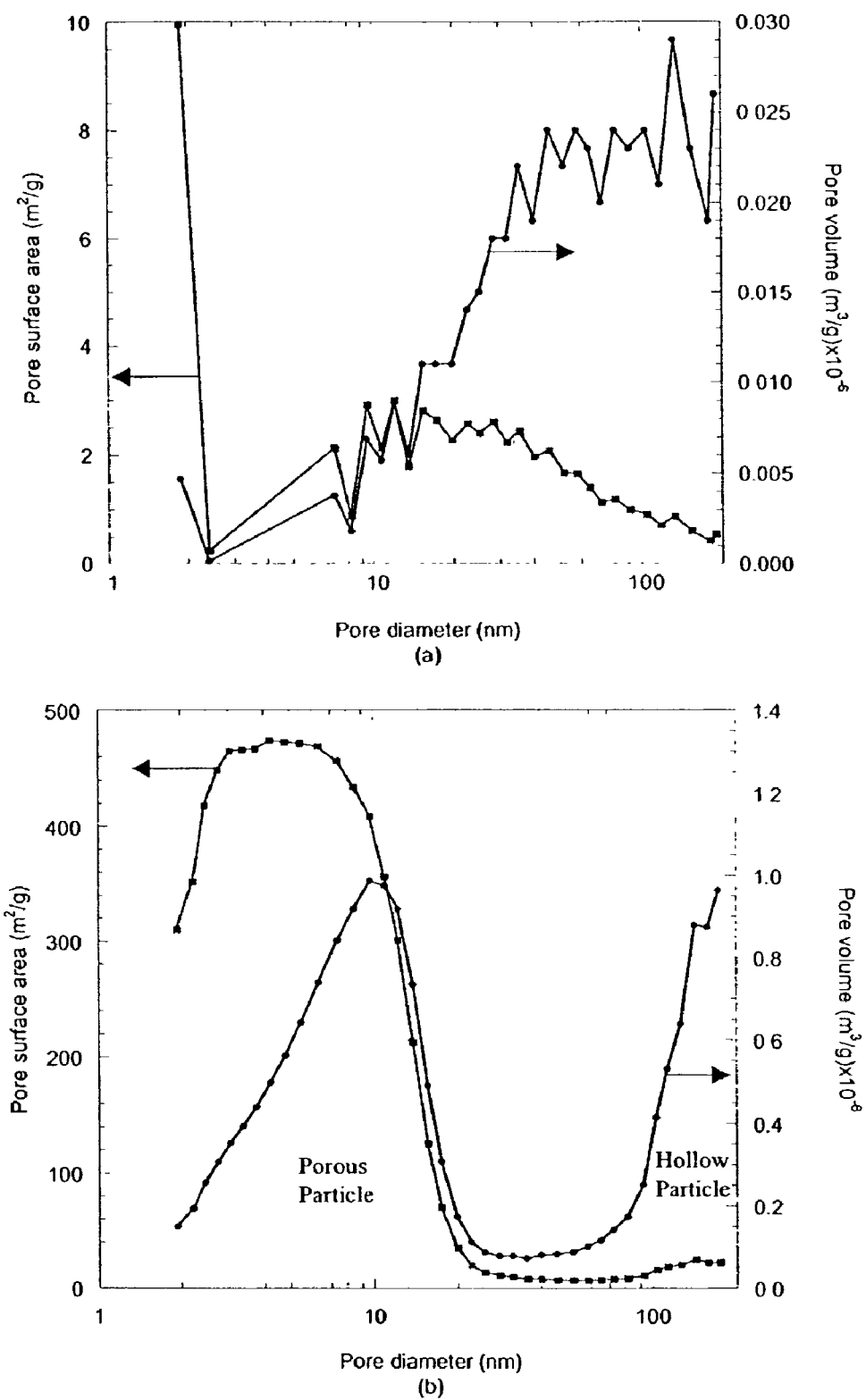
FIG. 9—Pore surface area and volume distribution: (a) before and (b) after salt removal ($Al(NO_3)_3$:NaCl=1:1 at 1 weight percent (wt %) solution, synthesis temperature 550° C., relative humidity=30%).

FIG. 9 shows specific surface area and pore size distributions of nanoporous oxide particles produced by the preferred methods of the present invention and determined by a Gas Sorptometer (BET; ASAP 2000, Micrometrics; nitrogen adsorption at 77K). The precursor composition included about a 1 weight percent total salt concentration, based on total weight of the composition, and about a 1:1 mole ratio of aluminum nitrate to sodium chloride. The precursor composition was spray pyrolyzed at a temperature of about 550° C. and a relative humidity of about 30%. FIG. 9(a) shows specific surface areas of the particle of only a few square meters per gram, with a near monotonic increase in pore volume with increasing pore diameter. The pore volume increase presumably arises from hollow particles that are observed in the SEM, corresponding to a very small surface area.

More interesting is the analysis of particles following aqueous leaching of the Matrix salt (FIG. 9(b)). Pore volume shows a bimodal distribution, with the large mode corresponding to hollow particles and the smaller mode corresponding to the nanoporous structure revealed as a result of removal of the matrix salt.

Figure 11:
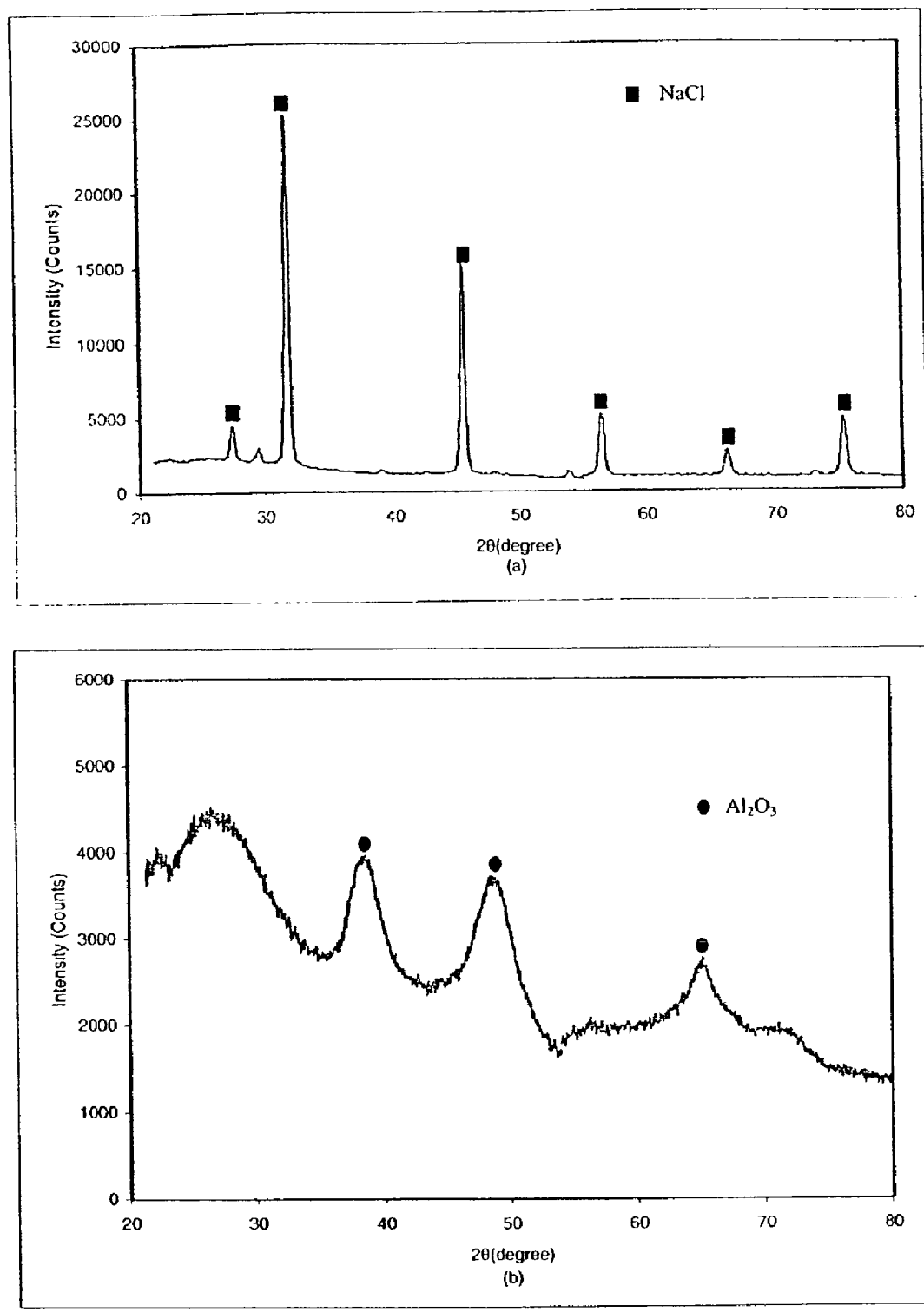
FIG. 11—X-ray diffraction patterns of spray pyrolyzed (a) $Al_2O_3$ and NaCl (T=550° C., before washing process) and (b) $Al_2O_3$ particles (T=550° C., after washing process).

Powder X-ray diffraction patterns (XRD; Model D-5000, Siemens, using CuKα radiation) are shown in FIGS. 11(a) and 11(b) for nanoporous aluminum oxide particles produced by spray pyrolysis both prior to (FIG. 11(a)) and after (FIG. 11(b)) aqueous wash. The precursor composition included about a 1 weight percent concentration, based on total weight of the composition, of aluminum nitrate and sodium chloride, with the salts present in the aqueous precursor in a mole ratio of about 1:1. For the resulting nanoporous oxide particles, the spectra showed very strong diffraction from salt with a crystallite size estimated using Scherrer's equation (Guinier, *X-Ray Diffraction*, Freeman, San Francisco, page 124 (1963)) of about 7 nanometers (FIG. 11(a)). After washing the low intensity broad structure corresponding to alumina with a crystallite size of about 4 nanometers (FIG. 11(b)) may be seen.

The patents, patent documents, and publications cited herein are incorporated by reference in their entirety, as if each were individually incorporated by reference. Various modifications and alterations of this invention will become apparent to those skilled in the art without departing from the scope and spirit of the invention, and it should be understood that this invention is not to be unduly limited to the illustrative embodiments set forth herein.

What is claimed is:

1. A method of forming nanoporous particles comprising a metal oxide, the method comprising:
   providing a precursor composition comprising at least one reactive precursor salt and at least one matrix salt, wherein the decomposition temperature of the reactive precursor salt is lower than the melting point of the matrix salt;
   spray pyrolyzing the precursor composition, thereby forming precursor droplets, at a temperature below the melting point of the matrix salt and above the decomposition temperature of the precursor salt to form particles comprising matrix salt and decomposed precursor salt, wherein the relative humidity of spray pyrolyzing is carried out at a relative humidity of at least about 50% and no greater than about 80%; and
   rinsing the matrix salt from the particles to form nanoporous metal oxide particles.

2. The method of claim 1 wherein the precursor composition comprises a mole ratio of precursor salt to matrix salt of at least about 1:1 and no greater than about 1:5.

3. The method of claim 2 wherein the precursor composition comprises a mole ratio of precursor salt to matrix salt that is no greater than about 1:3.

4. The method of claim 1 wherein the total concentration of precursor salt and matrix salt in the precursor composition is at least about 1 weight percent and no greater than about 3 weight percent, based on the total weight of the precursor composition.

5. The method of claim 1 wherein the spray pyrolyzing is carried out at a temperature of at least about 200° C. and no greater than about 700° C.

6. The method of claim 5 wherein spray pyrolyzing is carried out at a temperature no greater than about 550° C.

7. The method of claim 1 wherein the precursor composition is spray pyrolyzed under conditions effective to form particles and allow the matrix salt to diffuse into the interior of the particles.

8. The method of claim 1 wherein the diameter of the nanoporous metal oxide particles is at least about 90 nanometers.

9. The method of claim 1 wherein the precursor salt is selected from the group consisting of Group IIIA metal salts, Group IVA metal salts, Group VA metal salts, Group VIA metal salts, transition metal salts, and combinations thereof.

10. The method of claim 1 wherein the matrix salt is selected from the group consisting of fluorides, chlorides, bromides, iodides, and combinations thereof.

11. The method of claim 1 wherein the precursor composition is an aqueous precursor composition.

12. The method of claim 1 wherein rinsing comprises rinsing in an aqueous rinse to provide nanoporous metal oxide particles.

13. The method of claim 1 wherein the nanoporous metal oxide particles have a pore size of at least about 2 nanometers and no greater than about 20 nanometers in diameter.

14. The method of claim 9 wherein the precursor salt is selected from the group consisting of Group IIIA metal salts, Group IVA metal salts, Group VA metal salts, and combinations thereof.

15. A method of forming nanoporous particles comprising an aluminum oxide, the method comprising:
   providing a precursor composition comprising at least one reactive aluminum precursor salt and at least one matrix salt salt is lower than the melting point of the matrix salt;
   spray pyrolyzing the precursor composition, thereby forming precursor droplets, at a temperature below the melting point of the matrix salt and above the decomposition temperature of the precursor salt to form particles comprising matrix salt and decomposed precursor salt; and rinsing the matrix salt from the particles to form nanoporous aluminum oxide particles.

16. The method of claim 15 wherein the precursor composition is an aqueous precursor composition.

17. The method of claim 15 wherein rinsing comprises rinsing in an aqueous rinse to provide nanoporous aluminum oxide particles.

18. The method of claim 15 wherein the nanoporous aluminum oxide particles have a pore size of at least about 2 nanometers and no greater than about 20 nanometers in diameter.

19. The method of claim 15 wherein the aluminum precursor salt is selected from the group of a nitrate salt, a carbonate salt and an acetate salt.

20. The method of claim 19 wherein the precursor salt is aluminum nitrate.

21. The method of claim 15 wherein the matrix salt is selected from the group consisting of fluorides, chlorides, bromides, iodides, and combinations thereof.

22. A method of forming nanoporous particles of aluminum oxide comprising:

providing an aqueous precursor composition comprising at least one aluminum salt and at least one alkali metal salt, wherein the mole ratio of aluminum salt to alkali metal salt is about 1:1, and the concentration of aluminum salt and alkali metal salt present in the composition is about 1 weight percent, based on total weight of the composition;

spray pyrolyzing the precursor composition, thereby forming precursor droplets, at a temperature below the melting point of the alkali metal salt and above the decomposition temperature of the aluminum salt to form particles comprising alkali metal salt and decomposed aluminum salt, wherein the precursor composition is spray pyrolyzed under conditions to form aluminum oxide; and rinsing the alkali metal salt from the particles of alkali metal salt and decomposed aluminum salt in an aqueous rinse to form nanoporous particles of aluminum oxide.

23. The method of claim 22 wherein the nanoporous aluminum oxide particles have a pore size of at least about 2 nanometers and no greater than about 20 nanometers in diameter.

24. The method of claim 22 wherein the aluminum salt is aluminum nitrate.

25. The method of claim 22 wherein the alkali metal salt is sodium chloride.

* * * * *